(12) United States Patent
Robert

(10) Patent No.: US 6,756,130 B1
(45) Date of Patent: Jun. 29, 2004

(54) POLYOLEFIN FILMS CONTAINING GRAFTED QUINONES AND STRUCTURES COMPRISING SAME

(75) Inventor: Patrice Robert, Beaumont le Roger (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 10/111,185

(22) PCT Filed: Oct. 20, 2000

(86) PCT No.: PCT/FR00/02935

§ 371 (c)(1),
(2), (4) Date: Sep. 10, 2002

(87) PCT Pub. No.: WO01/29116

PCT Pub. Date: Apr. 26, 2001

(30) Foreign Application Priority Data

Oct. 20, 1999 (FR) .......................................... 99 13079

(51) Int. Cl.[7] .......................... B32B 27/08; B32B 27/30; B32B 27/32; B32B 27/38; B65D 85/00
(52) U.S. Cl. ................. 428/516; 206/524.1; 206/524.2; 428/409; 428/413; 428/500; 428/523
(58) Field of Search ............................. 426/112, 124, 426/127, 118; 428/409, 413, 500, 523, 516, 118; 206/524.1, 524.2

(56) References Cited

U.S. PATENT DOCUMENTS 4,657,842 A * 4/1987 Finter et al. ............. 430/280.1

FOREIGN PATENT DOCUMENTS

| WO | WO 94/12590 A1 | 6/1994 |
| WO | WO 96/34070 A1 | 10/1996 |
| WO | WO 99/10251 A1 | 3/1999 |

OTHER PUBLICATIONS

Database WPI, Section Ch, Week 199318, Derwent Publications Ltd., London, GB; Class A14, AN 1993–148718, XP002141525 & JP 05 084738 A (Sekisui Chem. Ind. Co. Ltd.) Apr. 6, 1993 *abstract*.
Patent Abstracts of Japan, vol. 1999, No. 05, (May 31, 1999) & JP 11 052560 A (JSR Corp.) Feb. 26, 1999.

* cited by examiner

Primary Examiner—Philip Tucker
Assistant Examiner—Michael J Feely
(74) Attorney, Agent, or Firm—Millen White Zelano & Branigan P.C.

(57) ABSTRACT

The invention concerns a film comprising ethylene copolymers and an unsaturated epoxide and comprising quinones grafted on said copolymers. The invention also concerns a structure comprising at least an oxygen-barrier film and at least said oxygen-absorber film. The invention further concerns a packaging element comprising said structure wherein, starting from inside and moving outwards, there is first the oxygen-absorber-film followed by the barrier film.

21 Claims, No Drawings

POLYOLEFIN FILMS CONTAINING GRAFTED QUINONES AND STRUCTURES COMPRISING SAME

The present invention relates to an oxygen-absorbing film and more particularly to a film of polyolefins comprising grafted quinones and also relates to a packaging comprising such a film.

Numerous foodstuffs decompose on contact with atmospheric oxygen; this is why use is made of packagings generally composed of a multilayer structure to preserve them during their transportation and their distribution and until they are consumed.

This structure comprises a film of a polymer which forms a barrier to oxygen, such as EVOH (copolymer of ethylene and of vinyl alcohol or saponified copolymer of ethylene and of vinyl acetate) or polyamides. However, a small amount of air always enters before the packaging is closed. It is not always possible to create a vacuum. Furthermore, foods with porous structures can comprise air, which it is difficult to remove, even by creating a vacuum.

Structures have been developed comprising a barrier film and an oxygen-absorbing film which are positioned so that the barrier film is on the outside and the oxygen-absorbing film is on the inside of the packaging, the inside of the packaging defining the surface of the packaging in contact with the food which it comprises and the outside of the packaging defining the surface of the packaging in direct contact with the surrounding air. In fact, these structures also comprise other films, for example of polyethylene or of polypropylene, which provide for the mechanical strength of the structure and their protection against water.

The polyolefin film of the present invention comprising grafted quinones is an oxygen-absorbing film of use in the technology described above. The invention also relates to a structure comprising one or more oxygen-absorbing films and one or more barrier films.

Patent applications WO 94 12590, WO 96 34070 and WO 99 10251 disclose the technology set out above in the field of the invention and more particularly the oxygen-absorbing film and its operation. This technology consists in introducing anthraquinone (AQ) molecules into a polymer film. The operating principle of this system is broken down into 3 stages:

Activation Stage:

The quinone molecules are reduced to hydroquinone molecules under UV irradiation, the necessary protons being provided by proton donors present in the polymer. This activation is carried out after the manufacture of the packaging. Thus it is not necessary to manufacture this film under an inert atmosphere.

Absorption Stage:

The oxygen present inside the packaging and the small amounts of oxygen which might cross the barrier film react with the hydroquinones obtained in the preceding stage The reaction results in the production of quinone and of hydrogen peroxide $H_2O_2$.

$H_2O_2$ Destruction Stage:

This is carried out by a reducing agent present in the polymer. The amount of this reducing agent can be adjusted so as not to destroy all the $H_2O_2$, so as to leave a sufficient amount thereof to produce a bactericidal effect.

In the examples of these prior arts, the constituents of the oxygen-absorbing film are the following polymers:

blends of polymer with oxygen-absorbing molecules; these are not grafted polyolefins, that is to say that there is no chemical bond between the absorbing molecule and the polymer.

copolymers of styrene, of 2-hydroxyethyl methacrylate and of vinylanthraquinone.

EVOHs grafted by an anthraquinone which is functionalized with an acid chloride.

ethylene-acrylic acid copolymers which has reacted with bromoethylanthraquinone to give ethylene-anthraquinone acrylate copolymers.

The blending of molecules of the anthraquinone type with polymers is not easy to carry out and the copolymerization of these molecules of the anthraquinone type with other monomers is rendered difficult because of the high melting point of these molecules. Graftings by quinones carrying acid chloride groups or brominated groups are expensive because these functional groups are complicated to prepare and because the grafting generates brominated or chlorinated byproducts which are difficult to remove.

The Applicant Company has now found that quinones can be grafted onto polymers carrying epoxide groups and that they can be very easily converted into a film, it being possible for this film to be used as oxygen absorber in the abovementioned structures.

The present invention relates to a film comprising copolymers of ethylene and of an unsaturated epoxide and comprising quinones grafted onto these copolymers. The advantage of these films is that they can be easily manufactured and that the quinones which are grafted onto the copolymers are easy to manufacture. Another advantage is that these films can be activated by simple passage under UV radiation, without it being necessary to add a proton donor to the film.

The present invention also relates to a structure comprising at least one barrier film to oxygen and at least the preceding oxygen-absorbing film.

The present invention also relates to a packaging comprising the preceding structure, in which, starting from the inside of the packaging and proceeding toward the outside, first the oxygen-absorbing film is encountered, followed by the barrier film to oxygen.

The copolymers of ethylene and of an unsaturated epoxide can be polyethylenes grafted by an unsaturated epoxide or copolymers of ethylene and of an unsaturated epoxide which are obtained, for example, by radical polymerization.

Mention may be made, as examples of unsaturated epoxides to be grafted or to be polymerized, of:

aliphatic glycidyl esters and ethers, such as allyl glycidyl ether, glycidyl vinyl ether, glycidyl maleate, glycidyl itaconate or glycidyl (meth)acrylate, and alicyclic glycidyl esters and ethers, such as 2-cyclohexene-1 glycidyl ether, diglycidyl cyclohexene-4,5-carboxylate, glycidyl cyclohexene-4-carboxylate, glycidyl 5-norbornene-2-methyl-2-carboxylate and diglycidyl endo-cis-bicyclo-[2.2.1] hept-5-ene-2,3-dicarboxylate.

As regards the polyethylenes onto which the unsaturated epoxide is grafted, the term "polyethylene" is understood to mean homo- or copolymers.

Mention may be made, as comonomers, of:

α-olefins, advantageously those having from 3 to 30 carbon atoms; mention may be made, as examples of α-olefins, of propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-icocene, 1-docoene, 1-tetracocene, 1-hexacocene, 1-octacocene and 1-triacontene; these α-olefins can be used alone or as a mixture of two or of more than two, esters of unsaturated carboxylic acids, such as, for example, alkyl (meth)acrylates, it being possible for the alkyls to have up to 24 carbon atoms; examples of alkyl acrylate or methacrylate are in particular methyl methacrylate, ethyl acrylate, n-butyl acrylate, isobutyl acrylate and 2-ethylhexyl acrylate, vinyl esters of saturated carboxylic acids, such as, for example, vinyl acetate or propionate, dienes, such as, for example, 1,4-hexadiene.

The polyethylene can comprise several of the preceding comonomers.

The polyethylene, which can be a blend of several polymers, advantageously comprises at least 50% and preferably 75% (in moles) of ethylene; its density can be between 0.86 and 0.98 g/cm³. The MFI (viscosity index at 190° C., 2.16 kg) is advantageously between 0.1 and 1000 g/10 min.

Mention may be made, as examples of polyethylenes, of:

low density polyethylene (LDPE)

high density polyethylene (HDPE)

linear low density polyethylene (LLDPE)

very low density polyethylene (VLDPE)

polyethylene obtained by metallocene catalysis, that is to say the polymers obtained by copolymerization of ethylene and of α-olefin, such as propylene, butene, hexene or octene, in the presence of a single-site catalyst generally composed of a zirconium or titanium atom and of two cyclic alkyl molecules bonded to the metal. More specifically, the metallocene catalysts are usually composed of two cyclopentadiene rings bonded to the metal. These catalysts are frequently used with aluminoxanes as cocatalysts or activators, preferably methylaluminoxane (MAO). Hafnium can also be used as metal to which the cyclopentadiene is attached. Other metallocenes can include transition metals from Groups IVA, VA and VIA. Metals from the lanthamide series can also be used.

EPR (ethylene/propylene rubber) elastomers

EPDM (ethylene/propylene/diene) elastomers

Blends of polyethylene with an EPR or an EPDM ethylene/alkyl (meth)acrylate copolymers which can comprise up to 60% by weight of alkyl (meth)acrylate and preferably 2 to 40% by weight.

The grafting is an operation known per se.

As regards the copolymers of ethylene and of the unsaturated epoxide not grafted onto the polyethylene, they are copolymers of ethylene, of the unsaturated epoxide and optionally of another monomer which can be chosen from the comonomers which were mentioned above for the ethylene copolymers intended to be grafted.

The copolymers of ethylene and of an unsaturated epoxide are advantageously ethylene/alkyl (meth)acrylate/unsaturated epoxide copolymers obtained by copolymerization of the monomers and not by grafting the unsaturated epoxide onto the polyethylene. They comprise from 0 to 40% by weight of alkyl (meth)acrylate, preferably 5 to 35%, and up to 10% by weight of unsaturated epoxide, preferably 0.1 to 8%.

The unsaturated epoxide is advantageously glycidyl (meth)acrylate. The alkyl (meth)acrylate is advantageously chosen from methyl (meth)acrylate, ethyl acrylate, n-butyl acrylate, isobutyl acrylate or 2-ethylhexyl acrylate The amount of alkyl (meth)acrylate is advantageously from 20 to 35%. The MFI is advantageously between 5 and 100 (in g/10 min at 190° C. under 2.16 kg) and the melting temperature is between 60 and 110° C.

As regards the quinones which will be grafted onto the preceding copolymers, mention may be made, as examples, of benzoquinone, anthraquinone and naphthoquinone. The quinone carries a functional group capable of reacting with the epoxide group of the copolymer. Mention may be made, as examples, of carboxylic acids, salts of carboxylic acids, dicarboxylic acid anhydrides, alcohols and amines. Carboxylic acids are preferred. The functionalized quinones are solids at ambient temperature. They are powdered and then they are added to the preceding copolymers, in the molten state, while carrying out intimate blending. The device in which this intimate blending is carried out can be any piece of equipment used for the blending of thermoplastics, such as a single- or twin-screw extruder, a blender or a Buss® Ko-Kneader. The functionalized quinones are added to these blending devices using hoppers or any device for introducing powders. The particle size of these powders can be highly variable. The finer it is, the more homogeneous the incorporation of the powder in the polymer melt. It is advantageously at most 200 μm and preferably between 10 and 150 μm.

The copolymer in the molten state comprising the grafted quinones can be conveyed to a device for converting it into a film or cooled and recovered in the form of granules to be subsequently converted into a film, like the majority of thermoplastics. The thickness of the film can be between 10 and 300 μm and preferably between 15 and 150 μm.

The proportion of functionalized quinone to be used is one quinone per epoxide functional group. As regards the carboxylated anthraquinone (AQ), its grafting onto the copolymer of ethylene and of an unsaturated epoxide (glycidyl methacrylate) can be represented by the following equation:

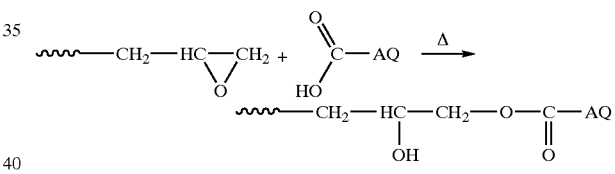

in which "AQ" denotes the anthraquinone.

The quinone functional groups can subsequently be activated but it is recommended only to do it when the packaging is closed or ready to be closed. This activation can be carried out by exposure to UV radiation or any wavelength appropriate to the quinones used or by heat, gamma rays, a corona discharge or a beam of electrons. The film can also comprise an agent for destroying the $H_2O_2$ formed, such as, for example, a triphenylphosphine, a triphenyl phosphite, triethyl phosphite, triisopropyl phosphite, tris(nonylphenyl) phosphite, tris(mono- and bisnonylphenyl)phosphite, butylhydroxytoluene, butylhydroxyanisole, tris(2,4-di(tert-butyl)phenyl)phosphite, dilauryl thiodipropionate, 2,2'-methylenebis(6-t-butyl-p-cresol), tetrakis(2,4-di(tert-butyl) phenyl)-4,4'-biphenylenediphosphonite, poly(4-vinylpyridine) or their mixtures.

As regards the multilayer structure comprising at least one barrier film to oxygen and at least the preceding oxygen-absorbing film, the barrier film is advantageously made of EVOH, of polyamide, of polyketone or of PVDF. This structure advantageously also comprises one or more polyolefin films for strengthening the structure and for protection against water. If the barrier film is made of EVOH, the structure advantageously comprises a film made of polyolefin, such as polyethylene or polypropylene, on each side of the barrier film. This is because EVOH is sensitive to moisture and loses its oxygen-barrier property in the presence of moisture. Advantageously, the structure of the invention thus successively comprises: a polyolefin film, an EVOH film, a polyolefin film and the film comprising the grafted quinones as oxygen absorber with thicknesses advantageously (in the same order μm): 10 to 100/5 to 20/10 to 100/15 to 150.

According to another form of the invention, the structure additionally comprises a polyolefin film, the oxygen-absorbing film being thus sandwiched between two polyolefin films. As polyolefins are highly permeable to oxygen, this polyolefin film thus does not hinder the reaction of oxygen with the reduced quinones.

It would not be departing from the scope of the invention to position a binder, such as a coextrusion binder, between the preceding layers.

These structures can be manufactured by the usual techniques for multilayer films, such as cast or blown coextrusion or by extrusion coating.

The present invention also relates to a packaging comprising the preceding structure. It can be formed by the structure, which is closed by any means over itself to prepare sachets or bags therefrom. The structures of the invention may only be a portion of the packaging, for example the film which closes off a punnet. This punnet is advantageously made of a barrier material but does not comprise an oxygen-absorbing film, the oxygen absorber included in the film for closing off the punnet being sufficient. Once the packaging has been closed, the quinones are activated by reduction by passing under a UV lamp or any equivalent means.

EXAMPLE 1

Grafting of 2-carboxyanthraquinone onto Lotader AX 8840® in a twin-screw extruder.

Lotader AX 8840 is an ethylene/glycidyl methacrylate (GMA) random copolymer comprising 8% by weight of GMA and having an MFI of 4 (at 190° C. under 2.16 kg).

2-Carboxyanthraquinone, of expanded formula:

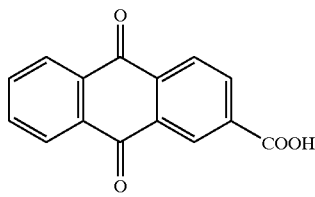

This compound is provided in the form of a yellow powder and has a melting point of 288° C.

The grafting is carried out in the molten state in a Leistritz® laboratory corotating twin-screw extruder.

The thermal profile of the extruder is set at 200° C. The Lotader® is introduced into the feed hopper in the first region of the extruder using a weight metering device. The 2-carboxyanthraquinone is introduced in the powder form using another metering device. The proportions used are: 88% Lotader AX 8840®/12% 2-carboxyanthraquinone. The reactive extrusion of the blend of the 2 components is carried out at a throughput of 6 kg/h and at a rotational speed of the screws of 50 revolutions/min. The grafted product is extruded in the form of a stick, which is cooled in a water tank and then granulated after passing into a granulator.

The product obtained has a melt index (MFI), measured at 190° C. under 2.16 kg, of 2.

Analysis by infrared spectroscopy shows the disappearance of the epoxy functional groups and the appearance of the OH functional groups.

The product was subsequently extruded in the form of a 100 μm film using a cast film extruder supplied by Scamia®. The film is completely transparent and exhibits a light "coppery" color.

EXAMPLE 2

Grafting of 2-carboxyanthraquinone onto Lotader AX 8900®.

Lotader AX 8900® is an ethylene/methyl acrylate/glycidyl methacrylate (GMA) random terpolymer comprising 8% by weight of GMA and 28% by weight of ethyl acrylate and having an MFI of 6 (at 190° C. under 2.16 kg).

The grafting is carried out in the molten state in a blender, the Brabender® laboratory internal mixer.

The temperature of the body of the blender was set at 220° C.

The Lotader AX 8900® and the 2-carboxyanthra-quinone are introduced into the chamber of the blender and the reactants are blended for 4 min. The proportions used are: 96% Lotader AX 8900/4% 2-carboxy-anthraquinone. The rotational speed of the blades is set at 50 rev/min.

The product is subsequently formed under a press to give a 200 μm film.

EXAMPLE 3

Activation of the product of Example 2 by photoreduction under UV radiation

A 0.6 g sample of the film prepared in Example 2 was activated by passing under a laboratory UV rig of Minicure type equipped with a mercury lamp.

The irradiation time of the film was 12 s.

EXAMPLE 4

Measurement of the oxygen-absorbing properties

The activated film of Example 3 was subsequently placed in a cell comprising oxygen. The decrease in the amount of oxygen gas was monitored over time by gas chromatography:

volume of oxygen absorbed after 5 h: 4 ml

What is claimed is:

1. An oxygen-absorbing film comprising at least one ethylene/alkyl (meth)acrylate/unsaturated epoxide copolymer obtained by copolymerization and comprising up to 40% by weight of alkyl (meth)acrylate and up to 10% by weight of unsaturated epoxide, said at least one copolymer being grafted by at least one quinone.

2. The film as claimed in claim 1, in which the at least one grafted quinone are chosen from the group consisting of benzoquinone, anthraquinone and naphthoquinone and mixtures thereof, said at least one quinone having a functional group capable of reacting with the epoxide group of the unsaturated epoxide.

3. The film as claimed in claim 2, in which said at least one quinone has a carboxylic acid functional group.

4. A structure comprising at least one barrier film to oxygen and at least one oxygen-absorbing film according to claim 3.

5. The structure as claimed in claim 4, wherein said at least one barrier film to oxygen is made from EVOH, polyamide, polyketone or PVDF.

6. A structure comprising at least one barrier film to oxygen and at least one oxygen-absorbing film according to claim 2.

7. The structure as claimed in claim 6, wherein said at least one barrier film to oxygen is made from EVOH, polyamide, polyketone or PVDF.

8. The film according to claim 2, wherein the functional group is a carboxylic acid, a salt of a carboxylic acid, a dicarboxylic acid anhydride, an alcohol, or an amine.

9. A structure comprising at least one barrier film to oxygen and at least one oxygen-absorbing film according to claim 1.

10. A packaging comprising the structure as claimed in claim 9, in which, starting from the inside of the packaging and proceeding towards the outside, said oxygen-absorbing film is first encountered, followed by said barrier film to oxygen.

11. The structure as claimed in claim 9, wherein said at least one barrier film to oxygen is made from EVOH, polyamide, polyketone or of PVDF.

12. A packaging comprising the structure as claimed in claim 11, in which, starting from the inside of the packaging and proceeding towards the outside, said oxygen-absorbing film is first encountered, followed by said barrier film to oxygen.

13. The structure as claimed in claim 11, successively comprising: a polyolefin film, an EVOH film, a polyolefin film and said oxygen-absorbing film.

14. A packaging comprising the structure as claimed in claim 13, in which, starting from the inside of the packaging and proceeding towards the outside, said oxygen-absorbing film is first encountered, followed by said barrier film to oxygen.

15. The film as claimed in claim 1, in which said at least one quinone has a carboxylic acid functional group.

16. A structure comprising at least one barrier film to oxygen and at least one oxygen-absorbing film according to claim 15.

17. The film according to claim 1, wherein the unsaturated epoxide of the copolymer is glycidyl (meth)acrylate.

18. The film according to claim 1, wherein the alkyl (meth)acrylate of the copolymer is methyl (meth)acrylate, ethyl acrylate, n-butyl acrylate, isobutyl acrylate or 2-ethylhexyl acrylate.

19. The film according to claim 1, wherein the ethylene/alkyl (meth)acrylate/unsaturated epoxide copolymer comprises 5–35% by weight alkyl (meth)acrylate.

20. The film according to claim 1, wherein the ethylene/alkyl (meth)acrylate/unsaturated epoxide copolymer comprises 0.1–8% by weight unsaturated epoxide.

21. A structure, successively comprising:

a polyolefin film;

an EVOH film;

a polyolefin film; and an oxygen absorbing film comprising at least one copolymer of ethylene and an unsaturated epoxide, the at least one copolymer being grafted by at least one quinone.

* * * * *